(12) United States Patent
Register et al.

(10) Patent No.: US 12,477,073 B2
(45) Date of Patent: *Nov. 18, 2025

(54) LED PANEL HAVING INTEGRATED INFRARED RETROREFLECTORS FOR VIDEO VOLUME PRODUCTION ENVIRONMENTS

(71) Applicants: Joseph Register, Tampa, FL (US); Timothy Moore, Tampa, FL (US)

(72) Inventors: Joseph Register, Tampa, FL (US); Timothy Moore, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/439,366

(22) Filed: Feb. 12, 2024

(65) Prior Publication Data

US 2024/0187543 A1 Jun. 6, 2024

Related U.S. Application Data

(63) Continuation of application No. 17/572,014, filed on Jan. 10, 2022, now Pat. No. 11,902,691.

(Continued)

(51) Int. Cl.
*H04N 5/222* (2006.01)
*G01S 17/66* (2006.01)
(Continued)

(52) U.S. Cl.
CPC ........... *H04N 5/2224* (2013.01); *G01S 17/66* (2013.01); *G02B 5/12* (2013.01); *G06F 3/1446* (2013.01); *H04N 23/50* (2023.01)

(58) Field of Classification Search
CPC ...... H04N 5/2224; H04N 23/50; H04N 5/222; H04N 5/275; H04N 5/262; H04N 5/272; H04N 5/235; H04N 5/445; H04N 21/2187; H04N 21/414; H04N 21/43; H04N 21/472; H04N 21/41; H04N 21/431;
(Continued)

(56) References Cited

U.S. PATENT DOCUMENTS

2014/0378222 A1* 12/2014 Balakrishnan .......... A63F 13/70
463/31
2020/0154004 A1* 5/2020 Derry ..................... H04N 23/56
(Continued)

*Primary Examiner* — Chanh D Nguyen
*Assistant Examiner* — Nguyen H Truong
(74) *Attorney, Agent, or Firm* — The Keys Law Firm, PLLC

(57) ABSTRACT

A LED panel wherein a plurality thereof are employed to construct a LED volume for filing simulated virtual environments wherein the LED panel of the present invention provides tracking of objects in the vicinity thereof such as but not limited to a camera wherein the tracking elements do not require post production removal. The LED panel includes a housing having a perimeter frame that has a transparent LED display mounted thereto. On the rear surface of the LED display or proximate thereto are a plurality of retroreflectors. The retroreflectors function to provide inside-out tracking of a camera disposed within the LED volume. The present invention further includes a plurality of lidar sensors and optical sensors mounted to the perimeter frame. The lidar sensors and optical sensors provide data for outside-in tracking of a camera within the LED volume. The retroreflectors can be provided in multiple alternate embodiments.

14 Claims, 1 Drawing Sheet

Related U.S. Application Data

(60) Provisional application No. 63/136,058, filed on Jan. 11, 2021.

(51) Int. Cl.
  *G02B 5/12* (2006.01)
  *G06F 3/14* (2006.01)
  *G06T 7/70* (2017.01)
  *H04N 23/50* (2023.01)
  *H04N 23/56* (2023.01)

(58) Field of Classification Search
  CPC ........... H04N 21/4402; H04N 21/8545; H04N 21/44; H04N 21/4415; H04N 21/2343; H04N 21/2365; H04N 23/56; H04N 23/60; H04N 23/81; H04N 23/84; H04N 23/67; H04N 23/11; G01S 17/66; G02B 5/12; G02B 27/00; G02B 27/01; G02B 27/14; G06F 3/1446; G06F 3/01; G06F 3/14; G06F 3/147; G06F 9/48; G06F 9/54; G06F 9/445; G06T 7/20; G06T 7/70; G06T 15/10; G06T 19/00; G06V 20/40; G06V 10/25; G06V 10/60; G06V 10/74; G11B 27/036; G06Q 10/101; G06Q 50/00; G01M 11/00; G01M 11/02; A61B 5/00; A61B 5/024; A61B 34/10; A61B 34/20; A61B 90/00; A61B 90/50; A63B 24/00; A63B 71/06
  USPC .......................................... 345/1.3, 156, 204
  See application file for complete search history.

(56) References Cited

U.S. PATENT DOCUMENTS

| | | | |
|---|---|---|---|
| 2020/0154059 A1* | 5/2020 | Derry | H04N 23/60 |
| 2021/0136346 A1* | 5/2021 | Millett | G01S 17/894 |
| 2021/0349381 A1* | 11/2021 | Mcnelley | H04N 7/15 |
| 2021/0368605 A1* | 11/2021 | Yang | G06F 3/167 |
| 2022/0201163 A1* | 6/2022 | Ukas-Bradley | H04N 5/2628 |
| 2024/0029293 A1* | 1/2024 | Cajic | H04N 23/56 |
| 2024/0220009 A1* | 7/2024 | Dryer | G06F 1/1626 |

\* cited by examiner

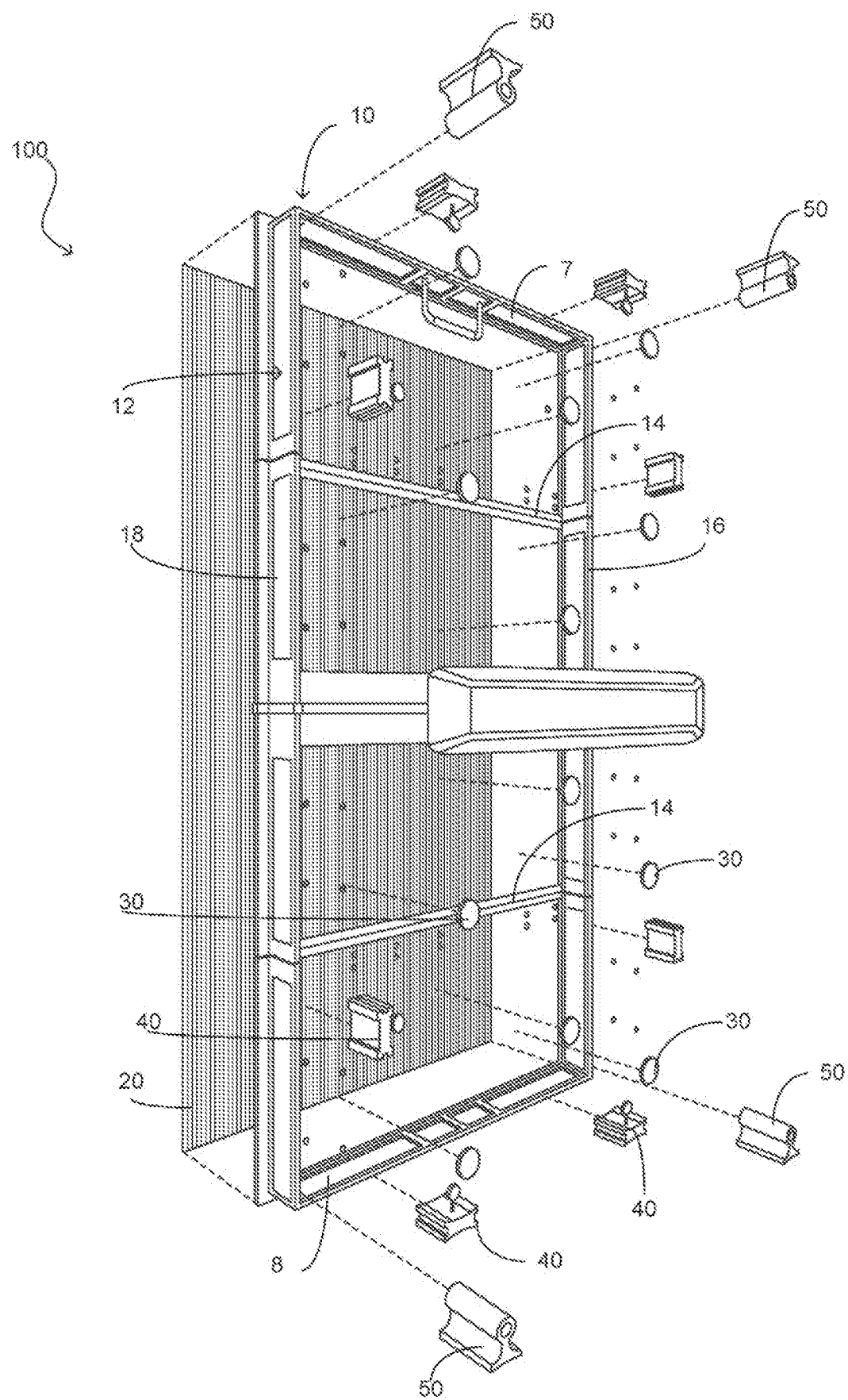

LED PANEL HAVING INTEGRATED INFRARED RETROREFLECTORS FOR VIDEO VOLUME PRODUCTION ENVIRONMENTS

CROSS REFERENCE TO RELATED APPLICATIONS

This application claims the benefit of and incorporates by reference U.S. non-provisional patent application Ser. No. 17/572,014, filed Jan. 10, 2022, which itself claimed the benefit of U.S. provisional patent application Ser. No. 63/136,058 filed Jan. 11, 2021.

BACKGROUND OF THE INVENTION

The present invention relates generally to virtual environments for film production, more specifically but not by way of limitation, a virtual film environment created with a plurality of LED panels wherein the LED panels of the present invention include a multitude of infrared retroreflectors embedded therein that are operable to provide three dimensional tracking of an object or camera.

BACKGROUND

The video industry commonly employs the utilization of LED walls to simulate virtual environments wherein the LED walls produce a photorealistic image on camera. These simulated virtual environments produce an image that appears real on camera and are a cost effective alternative to location based shooting. Utilization of these virtual environments allows a real time rendering of backgrounds and is a significant improvement to conventional green screen technology which requires the background to be removed and rendered in post-production. The utilization of LED wall environments is referred to as virtual production or in camera visual effects. These LED walls are often constructed in studios and referred to as LED volumes when built in the shape of a dome.

The LED volumes are composed of a multitude of LED wall panels and LED ceiling panels so as to simulate a full three hundred and sixty degree environment of a virtual location. This technique offers advantages over traditional green screen video techniques by providing improved simulated lighting and reflections that are nearly indistinguishable from live shots in these environments which results in more accurate final images. By way of example but not limitation, a vehicle filmed on a green screen has complex reflections of green that appear in the mirrors, contours and windows and additionally has contamination of green ambient light thereon. Whereas an LED volume portrays a real time background through the windows and mirrors resulting in the reflection of the correct ambient light colors and visuals on the car in real time. This creates a level of realism that is far superior to the green screen scenes, which have to be manually created and manipulated in post-production.

For the illusion to work, the main camera within the LED volume must be tracked for position so that the environment can move appropriately to the perspective of the camera. This provides a forced perspective to create the illusion that the shot was filmed from a particular point of view that is a matching point of view of the objects such as but not limited to props on the stage. For example, when filming a car on a virtual road, the angle of the film capture should change perspectives in real time on the LED display from one lane to another when the camera is laterally moved from one lane to the other. For proper execution of the aforementioned, the camera's location in three-dimensional space must be tracked wherein the positional data is updated in a computer so that the proper perspective is displayed on the screen. This positional feedback loop that is created by using camera tracking is one of the most unique and important features to make virtual production appear real.

Currently there are two optical tracking methodologies that are commonly used for tracking the camera's position. The first is referred to as outside-in tracking and the second is referred to as inside-out tracking. In outside-in tracking, tracking devices are placed in stationary locations surrounding a marker on the tracked camera to determine its position in space by cross-referencing the position of the marker relative to the position of the tracking devices. These type of systems typically have multiple tracking devices that allow for a 360 degree perspective of the tracking marker on the tracked camera, and this overlap allows for accurate readings of the camera's position. The second existing methodology, inside-out tracking is the alternate methodology in which the tracking emitter is placed directly on the camera and looks outward to determine its location using markers within the room. These markers, often referred to as tracking stars, are signal reflectors used to triangulate the tracking emitters location in three-dimensional space. Often times a star constellation of tracking stars is created so as to increase the amount of tracking points, wherein hundreds of randomized reflective tracking markers are placed on the wall or ceiling to determine the camera's position in three-dimensional space.

The problem with the aforementioned existing technologies is inside the LED volume both of these methodologies rely on visible tracking elements that are often times visible in the final scene. The outside in camera tracking spoils the effect by appearing as a ring of tracking devices in the final footage and the inside out methodology show up as spotty artifacts where the star constellation markers occlude the virtual image on the LED screen. Ultimately, both of these methodologies require editors to remove these tracking devices or markers in post-production, which results in decreased workflow efficiency and increased cost. The goal of virtual production is to avoid the post-production process by recording real time virtual environments in camera and avoid having to remove tracking devices or tracking markers that are visible in the film but this cannot be accomplished with existing technology.

Accordingly, there is a need for a LED panel that is utilized to create a LED volume for virtual film environments wherein the LED panel is constructed so as to provide positional tracking of the camera wherein the elements utilized to provide positional tracking are invisible on the captured photographic images of the camera.

SUMMARY OF THE INVENTION

It is the object of the present invention to provide a LED panel utilized to construct LED volumes wherein the LED panel is operable to provide positional tracking of at least one camera wherein the LED panel of the present invention is housed in a cabinet.

Another object of the present invention is to provide a LED volume constructed from a plurality of LED panels that provide an ability to allow filming of real time virtual environments and three dimensional tracking of at least one camera and eliminate post-production requirements wherein the present invention employs embedding a plurality of retroreflectors into the LED panels wherein the retroreflectors are non-visible markers utilized to provide camera and/or object tracking.

A further object of the present invention is to provide a LED panel utilized to construct LED volumes wherein the LED panel is operable to provide positional tracking of at least one camera wherein at distances of more than a few feet the retroreflectors disappear visually to the at least one camera and still provide infrared tracking data so as to determine positional location of the camera.

Still another object of the present invention is to provide a LED volume constructed from a plurality of LED panels that provide an ability to allow filming of real time virtual environments and three dimensional tracking of at least one camera and eliminate post-production requirements wherein the integrated infrared tracking retroreflector can be embedded into the LED display panel as a small disk on the rear of the panel or on the front shader of the LED panel.

An additional object of the present invention is to provide a LED panel utilized to construct LED volumes wherein the LED panel is operable to provide positional tracking of at least one camera wherein the integrated infrared retroreflectors can further be integrated onto the pixel capsule, the enclosure that encapsulates the pixel wherein the pixel capsule can be coated with an infrared reflective chemical or material that is non-visible.

Yet a further object of the present invention is to provide a LED volume constructed from a plurality of LED panels that provide an ability to allow filming of real time virtual environments and three dimensional tracking of at least one camera and eliminate post-production requirements wherein the present invention employs an outside-in version of camera tracking achieved by embedding a plurality of infrared retroreflectors and/or a plurality of Lidar depth sensors into the LED panel in alternate locations to determine the camera position in space relative to the infrared retroreflectors and/or Lidar depth sensors.

Another object of the present invention is to provide a LED panel utilized to construct LED volumes wherein the LED panel is operable to provide positional tracking of at least one camera wherein the present invention provides discrete embedded tracking sensors in the LED panel so as to facilitate the process of capturing in-camera visual effects in an LED display in order to improve efficiency through substantial reduction of post production.

Still an additional object of the present invention is to provide a LED volume constructed from a plurality of LED panels that provide an ability to allow filming of real time virtual environments and three dimensional tracking of at least one camera and eliminate post-production requirements wherein the present invention provides a plurality of tracking sensors to collect depth and positional data for more accurate scanning and positional data of a camera and objects.

Yet another object of the present invention is to provide a LED panel utilized to construct LED volumes wherein the LED panel is operable to provide positional tracking of a plurality of cameras and objects disposed within the LED volume constructed with the LED panels of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is an exploded rear view of an exemplary LED panel of the present invention.

DETAILED DESCRIPTION

Referring now to the drawings submitted herewith, wherein various elements depicted therein are not necessarily drawn to scale and wherein through the views and FIGURES like elements are referenced with identical reference numerals, there is illustrated a LED panel 100 constructed according to the principles of the present invention.

An embodiment of the present invention is discussed herein with reference to the FIGURES submitted herewith. Those skilled in the art will understand that the detailed description herein with respect to these FIGURES is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the FIGURES submitted as a part hereof, the LED panel 100 includes a housing 10 having an outer frame 12 manufactured from a suitable lightweight rigid material such as but not limited to plastic. The frame 12 includes cross members 14 wherein the cross members 14 are perpendicularly oriented between the opposing side members 16, 18. It should be understood within the scope of the present invention that the frame 12 could have varying quantities of cross members depending on the size of the frame 12. While the frame 12 is illustrated as being rectangular in shape herein, it should be understood within the scope of the present invention that the frame 12 could be provided in various shapes and sizes. Additionally, while one LED panel 100 is illustrated herein, it should be understood within a preferred embodiment of the present invention that the LED panel 100 is utilized to construct a LED volume for virtual filming wherein the LED volume is constructed of numerous LED panels 100 all be of the same construction as discussed herein for the LED panel 100. While not particularly illustrated herein, it should be understood within the scope of the present invention that operation of the LED panel 100 is executed through conventional computing devices.

Secured to the frame 12 utilizing suitable techniques is a display screen 20. The display screen 20 is disposed across the entire frame and is operable to provide display of desired images to be utilized in filming virtual environments. In its preferred embodiment the display screen 20 is a transparent LED screen. Secured to the rear surface, or proximate thereto, of the display screen 20 are a plurality of retroreflectors 30. The retroreflector 30 is operable to reflect light back to its source with minimal scattering. Furthermore, the retroreflector provides a wide range of angle of incidence. The plurality of retroreflectors are mounted to the display screen 20 providing coverage of all areas thereof. The retroreflectors 30 are utilized to provide tracking of an object such as but not limited to a camera that is proximate the LED panel 100. The retroreflectors 30 are located so as to inhibit the retroreflectors 30 from obscuring the pixels of the display screen 20. While the retroreflectors 30 in their preferred embodiment are small disk shaped as illustrated herein, it is contemplated that the retroreflectors 30 could be provided in alternate embodiments. By way of example but not limitation, the retroreflectors 30 could be provided so as to be mounted in an area between the pixels of the display screen 20 referred to as the front shader. Additionally, it is further contemplated within the scope of the present invention that the pixels of the display screen 20 could have a pixel capsule that is coated with an infrared reflective chemical so as to provide the desired function of providing light reflection for tracking of an object proximate to the display screen 20. It should be further understood within the scope of the present invention that the retroreflectors 30 could be provided in all of the aforementioned embodiments within a single LED panel 100. The retroreflectors 40 provide an ability to execute the aforementioned methodology of inside-out tracking of objects. Utilization of the retroreflectors 40 and the mounting location thereof improves the process of capturing in-camera visual effects in the screen display 20 as the final image in camera does not need post production in order to remove the retroreflectors 40 from the final image. Furthermore, deployment of a plurality of retroreflectors 40 provides an increase in available tracking data with no adverse effects.

The LED panel 100 further includes a plurality of lidar sensors 40. The lidar sensors 40 are secured around the perimeter of the frame 12. In a preferred embodiment, the lidar sensors 40 are secured to the side members 16, 18 as well as the upper cross member 7 and lower cross member 8. The lidar sensors 40 are conventional lidar sensors wherein the lidar sensors 40 are operable to provide light detection and ranging utilizing laser light to ping off objects so as to measure distance thereto and as such provide data for identifying the location of the pinged object. While the preferred embodiment of the LED panel 100 includes a plurality of lidar sensors 40 located on the perimeter of the frame 12, it should be understood within the scope of the present invention that as few as one lidar sensor 40 or a plurality of lidar sensors 40 could be employed. The lidar sensors 40 are employed to provide outside-in (as discussed previously herein) tracking of objects such as but not limited to a camera or prop.

The LED panel 100 further includes a plurality of optical sensors 50. The optical sensors 50 are secured to the frame 12 utilizing suitable techniques and are located on the upper cross member 7 and lower cross member 8. The optical sensors 50 in a preferred embodiment are optical triangulation position sensors operable to utilize reflected light waves to pinpoint position of an object. The optical sensor 50 projects light onto an object in the vicinity of the LED panel, such as but not limited to a camera, wherein the reflected light signal is utilized to determine position of the object. Utilization of the optical sensors 50 provides a technique to execute the aforementioned methodology of outside-in tracking of objects.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A LED panel utilized to construct a LED volume for filming simulated virtual environments wherein the LED panel comprises:
   a housing, said housing having a frame, said frame defining a perimeter edge for said housing;
   a display screen, said display screen having a front surface and a rear surface, said display screen being mounted within said housing, said display screen operable to display virtual images;
   at least one retroreflector, said at least one retroreflector being secured to the rear surface of said display screen, said at least one retroreflector configured to reflect light back to a source so as to provide positional identification of the source; and
   wherein the LED panel is operable to provide a first technique of object tracking within the LED volume through at least one integrated component that is integral with the frame and a second technique of object tracking within the LED volume that is distinct from the first technique of object tracking.

2. The LED panel utilized to construct a LED volume as recited in claim 1, and further including at least one lidar sensor, said at least one lidar sensor being secured to said frame, said at least one lidar sensor operable to provide tracking of at least one object utilizing the first technique.

3. The LED panel utilized to construct a LED volume as recited in claim 2, wherein the first technique employs an outside-in tracking methodology wherein the lidar sensors are employed to track an object disposed within the LED volume.

4. The LED panel utilized to construct a LED volume as recited in claim 3, and further including at least one optical sensor, said at least one optical sensor being secured to said frame, said at least one optical sensor operable to provide the first technique of object tracking.

5. The LED panel utilized to construct a LED volume as recited in claim 4, wherein said display screen is a transparent LED screen.

6. The LED panel utilized to construct a LED volume as recited in claim 5, wherein the at least one retroreflector is utilized to execute said second technique of object tracking.

7. The LED panel utilized to construct a LED volume as recited in claim 6, wherein said at least one retroreflector is annular in shape and proximate said rear surface of said display screen.

8. A LED panel configured to be combined with additional LED panels in order to create an environment for filming simulated virtual environments wherein the LED panel comprises:
 a housing, said housing having a frame, said frame defining a perimeter edge for said housing, said frame having opposing side members, said frame having an upper cross member and a lower cross member;
 a display screen, said display screen having a front surface and a rear surface, said display screen being mounted within said housing, said display screen being a transparent LED screen configured to display images;
 a plurality of retroreflectors, said plurality of retroreflectors being mounted proximate said rear surface of said display screen, said plurality of retroreflectors configured to reflect light back to a source so as to provide positional identification of the source;
 a plurality of lidar sensors, said plurality of lidar sensors configured to detect location of an object disposed within the LED volume; and
 wherein the LED panel is operable to provide a first technique and a second technique of object tracking within the LED volume.

9. The LED panel configured to be combined with additional LED panels in order to create an environment for filming simulated virtual environments as recited in claim 8, and further including a plurality of optical sensors, said plurality of optical sensors configured to execute said first technique of object tracking.

10. The LED panel configured to be combined with additional LED panels in order to create an environment for filming simulated virtual environments as recited in claim 9, wherein in said first technique of object tracking signals are transmitted from LED panel to an object disposed within the LED volume.

11. The LED panel configured to be combined with additional LED panels in order to create an environment for filming simulated virtual environments as recited in claim 10, wherein in said second technique of object tracking signals are transmitted from an object disposed within the LED volume towards the LED panel.

12. The LED panel configured to be combined with additional LED panels in order to create an environment for filming simulated virtual environments as recited in claim 11, wherein said plurality of retroreflectors are annular in shape and mounted proximate said rear surface of the display screen.

13. The LED panel configured to be combined with additional LED panels in order to create an environment for filming simulated virtual environments as recited in claim 12, wherein said plurality of retroreflectors are dispersed across substantially the display screen.

14. The LED panel configured to be combined with additional LED panels in order to create an environment for filming simulated virtual environments as recited in claim 11, wherein said plurality of retroreflectors are disposed on pixel capsules of the display screen.

* * * * *